Feb. 12, 1957     E. J. ONDECK     2,780,944
REVERSIBLE DRIVE FOR POWER TOOLS
Filed Feb. 26, 1954
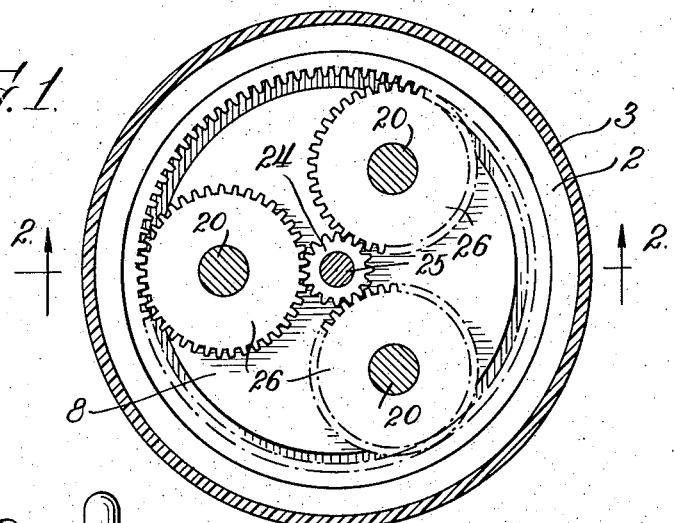
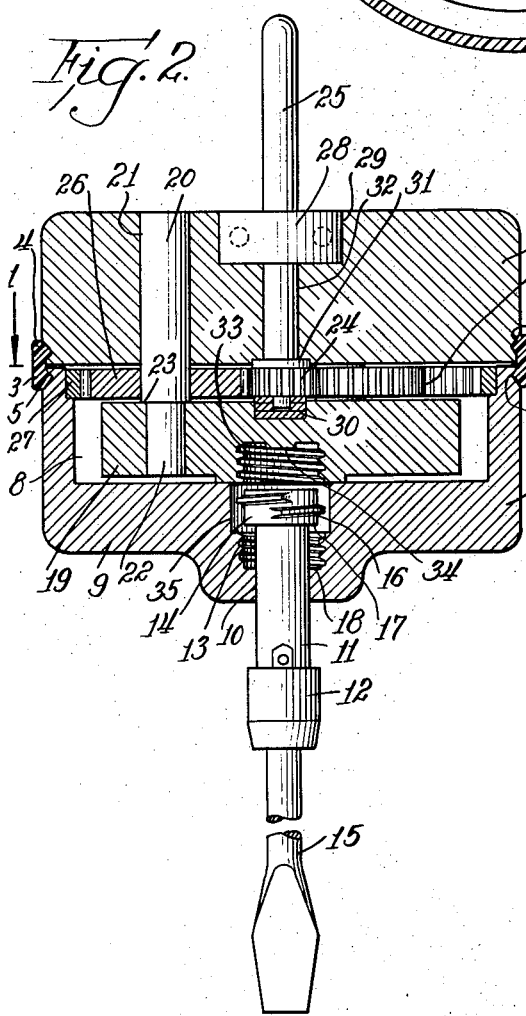
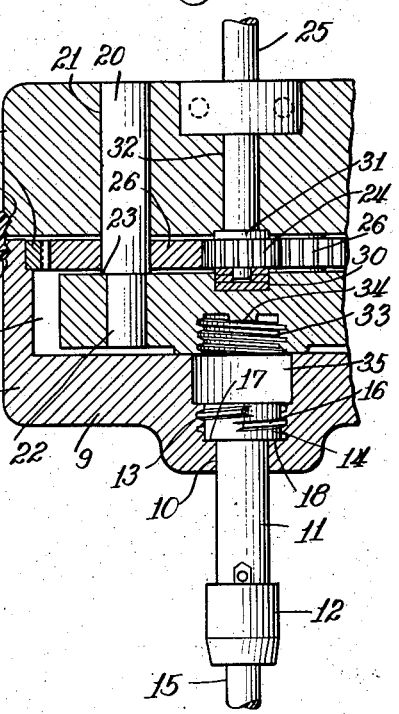
INVENTOR.
Elmer J. Ondeck

United States Patent Office 2,780,944
Patented Feb. 12, 1957

2,780,944

REVERSIBLE DRIVE FOR POWER TOOLS

Elmer J. Ondeck, Brookfield, Ill., assignor, by mesne assignments, to Supreme Products Corporation, Chicago, Ill., a corporation of Illinois Application February 26, 1954, Serial No. 412,716

13 Claims. (Cl. 74—764)

This invention relates to reversible drives for power tools such as drills, screw drivers, bolt tighteners and the like which have driving motors operable in one direction only. More especially the invention is concerned with an improved attachment for such tools whereby the driven element may be made to turn in either direction, selectively, as desired by the operator and without stopping or adjustment of the driving motor.

The main objects of this invention are to provide an improved reversing attachment for unidirectional motor driven hand tools; to provide such a device that is manually controlled either through a hand or mechanical grip to drive the driven element in either direction without stopping the motor; to provide such a device in which the driven element cannot jam and is instantly adjustable by hand for rotation in either direction; to provide a torque drive in which the transmission of the torque can be instantly checked or halted; to provide such a device that can readily be mounted on conventional hand tools as well as built in original equipment such as an electric drill, without special tools or fittings; and to provide such a device that is of simple, rugged construction capable of withstanding the abuse of shop use without becoming damaged or disabled.

A specific embodiment of this invention is shown in the accompanying drawings in which:

Fig. 1 is a sectional view of the improved device, as taken on line 1—1 of Fig. 2, showing the reversible driving means;

Fig. 2 is a sectional elevational view of the improved reversing attachment, as taken on line 2—2 of Fig. 1, showing the driven element in a neutral or intermediate position; and Fig. 3 is a similar view of the device showing the driven element in position to be turned in the direction opposite that of the driving shaft by which the device is actuated.

In the form shown in the drawings, the improved reversible drive as embodied in an attachment comprises a two-piece cylindrical body having a first or upper section 1 and a second or lower section 2, axially aligned with each other and connected together axially for relative rotation, one with respect to the other about a common axis, by means of a suitable annular collar member 3 which encircles the body sections 1 and 2 at the parting line between them; the collar member 3 having internal rib portions 4 and 5 which engage slidably in complementary annular grooves 6 and 7 respectively formed in the peripheries of the upper and lower body section.

As shown the lower body section 2 is cup-shaped, with its open end facing the upper section 1, and provides a hollow space 8, wholly enclosed in the assembly, within which the drive transmission is housed. Also the bottom or transverse end wall 9 of the lower section has an axial bore or passage 10, through which the shank 11 of a driven chuck member 12 extends with a slidable running fit in a suitable bearing, and the inner side of the end wall 9 is axially counterbored and internally threaded, as at 13, to provide a socket having clutch means for receiving and engaging an enlarged and externally threaded cylindrical head 14 integral on the inner end of the shank 11. A rotary tool, such as a screw driver bit 15, may be mounted in the chuck member 12 to be driven thereby.

Although the drive interengagement could be a two-way bayonet joint, such is preferably an external thread 16, on the shank head 14, that constitutes a single turn of a right hand Acme thread, as shown in Figs. 2 and 3, and the thread in the counterbore 13 is the same except that it extends into the counterbore a sufficient distance to permit the shoulder 17, between the head 14 and the shank 11, to butt squarely on the bottom 18 of the counterbore, the surfaces of the counterbore bottom 18 and the shoulder 17 being substantially at right angles or normal to the body axis.

Thus when the chuck member 12 is turned clockwise relative to the lower body portion 2, when viewed from the head end, and simultaneously pulled outward to engage the thread 16 with the clutch threads of the socket 13, the shank head 14 will abut the bottom of the socket so that rotation of the body portion 2 in the counterclockwise direction will drive the tool 15 likewise, or in the left hand operating direction. Because of the Acme thread on the shank head 14, however, there will be no binding or jamming of the shank head in the counterbore and upon cessation of rotation of the body portion 2, the head 14 can be unscrewed from the counterbore or socket by merely finger turning the shank or the driving member in a direction counter to its drive engagement direction of rotation.

The drive or power transmission means for rotating the lower body sections 2, comprises a planetary gear system mounted on the upper body section 1, between the inner face thereof and an annular inner body member 19, both the gearing and the inner body member being housed within the hollow interior 8 of the cup shaped bottom section 2. The inner body 19 is mounted on three equi-angularly spaced dowel pins or bearing members 20, which are press fitted into suitable bores 21 in the upper body portion 1 and which project from the inner face thereof. The dowel pins 20 also have reduced end portions 22, which are pressed into suitable bores in the inner body 19 to hold the same and shoulders 23 at the base of the reduced portions provide seats which position the inner body in predetermined spaced relation with the adjacent face of the upper body section and provide clearance for the planetary gear system.

In the form shown in the drawings the planetary gear system consists of a central sun gear, or pinion 24, mounted fast on the inner end of a drive shaft 25 which extends axially through the upper body section 1 and projects outwardly therefrom; a planet gear 26 rotatably mounted on each of the dowel pins 20, in driving engagement with the sun gear 24; and a ring gear 27 which encircles the several planets in driving engagement therewith. The planet gears are freely rotatable on their fixed dowel pin bearings and the ring gear 27 is fixedly mounted on the axially extending wall of the lower body section 2. Thus if the upper body member 1 is held stationary, rotation of the sun gear 24 will, through the intermediary planets 26, drive the ring gear 27 and cause rotation of the lower body member 2 in the direction opposite that of the sun gear. Or, if the lower body member 2, and hence the ring gear 27, is held stationary, rotation of the sun gear 24 will drive the planets 26 so as to cause them to run on the ring gear and drive the upper body member, through the dowel bearings 19, in the same direction as the sun gear is turning. This would be true regardless of the direction of rotation of the shaft 25.

As shown the drive shaft 25 is journalled in a ball bearing 28, press fitted into a suitable counterbored socket 29 in the outer face of the upper body section, and the inner end of the shaft is set into a thrust bearing 30 on the adjacent face of the retainer 19. A washer 31 is disposed between the adjacent faces of the sun gear and the upper body section, and the shaft 25 is rotatably fitted in the bore 32 in which it extends axially through the upper body section. Thus the bearing 28, the sun gear washer 31, and the thrust bearing 32, serve to hold the shaft 25 as an integral part of the driver attachment assembly. Also, the outwardly projecting portion of the shaft 25 serves as the spindle by which the attachment is mounted in the chuck of a power tool, such as an electric hand drill, for operation.

Usually the direction of rotation of the spindle and chuck of an electric drill, or similar power tool, is right handed or clockwise when viewed from the motor or drive end. Therefore, since the upper body portion of the attachment will turn in the same direction when the lower portion is held, a clutch means is provided for effecting driving engagement of the head 14, of the chuck member 12, with the inner body 19 so that the tool 15 held by the chuck 12 can also be driven in that direction. As shown, such means comprises a socket 33 formed in the bottom face of the inner body 19, in axial alignment with the shank 11, and internally threaded to receive the shank head 14. Thus, when the upper body section 1 and the inner body 19 are turning clockwise, in the direction of planet gear gyration, engagement of the thread 16 on the shank head with the threads of the socket 33 will cause the shank head to seat in the socket so as to be clutched and driven thereby. A stop 34 is preferably provided at the inner end of the socket 33 to engage the end of the shank head and prevent it from becoming jammed into the socket.

Operation of the tool 15 in the opposite or reversed direction will, of course, be had when the shank head 14 is engaged in the clutch or threaded socket 13 of the lower body section 2 and that body section is driven while the upper section 1 is being held. Thus the tool 15 can be driven in either direction depending upon which body portion is permitted to turn while engaged with the shank head 14. However, to assure that the thread 16 of the shank head will be fully disengaged from one threaded socket before being engaged by the threads of the other, a second axial counterbore 35 or enlargement of the socket 13 is formed in the inner face of the lower end wall 9 so as to provide a free or open space, between the adjacent ends of the threaded portions of the sockets 13 and 33, of greater length than the axial distance occupied by the single turn thread 16. Thus shifting of the shank head from engagement with one body section to engagement with the other must be done manually, however, by this means likelihood of breakage of the threads is obviated.

It will also be appreciated that if the unidirectional rotation of the spindle 25 is in the opposite or left hand direction, the turn of the thread 16 should be left handed; otherwise it would be preferred to have the thread made as two lands of 90° duration on opposite sides of the head to engage in T-shaped grooves on both the upper and lower members in bayonet-like engagement to provide an attachment that is universal in its adaption.

The annular collar member 3, or retaining ring, which holds the two body sections 1 and 2 in assembled and relatively rotatable relation, may be of any suitable form and material for accomplishing that result. As shown, however, the collar 3 is an endless member made of nylon, which material has strength and wear resistance, as well as good bearing characteristics, for sliding engagement with the rotating part.

In use and operation of the improved reversible driver attachment the device is mounted by the spindle or shaft 25 in the chuck of the prime driver, so that the device is wholly supported thereby, and the tool or bit 15, including tapping tools, to be driven is mounted in the chuck member 12, as shown in Fig. 2. Then the shank 11 of the chuck member is shifted manually, in or out according to the direction in which it is to be driven, and turned by the operator's fingers to engage the thread 16 with the threads of the clutch socket in the body part to be rotated. Then the other body part or section is held by the operator while power is applied to the shaft 25 by the primer driver. If, however, the spindle 25 is rotating the appropriate body section for the direction desired can be held and the threaded engagement is accomplished automatically.

Thus, if the tool to be driven is a screw driver and a screw driving operation is desired, assuming that the shaft 25 is to be turned clockwise when viewed from the driven end, the shank 11 will be shifted inwardly by the operator and manually turned until the thread 16 engages the socket 33 of the first or upper body section. Then the operator will hold the body section 2 and apply power to the shaft 25, whereupon the first body section will be rotated in the same direction as the shaft 25, by the gyratory travel of the planet gears 26, and will thereby turn the screw driver in the right hand.

Conversely, if it is desired to drive the tool 16 in the reverse or left hand direction, the operator will shift the clutch member outwardly, engage the thread 16 with the socket 13, and then hold the upper body section. Thus, when power is applied to turn the shaft 25, the planet gears 26, being held by their bearings on the upper body section, will drive the ring gear 27 and thereby rotate the lower or second body section in the counterclockwise direction and cause left hand turning of the screw driver, as for the unscrewing operation.

The main advantages of this invention reside in the provision of a single relatively simple, easily operated attachment for driving a tool in either direction as desired by the operator, and in the ease and rapidity with which the driving direction can be reversed by substantially only the shifting of the driven element from one section of the device to the other while the one section is held stationary.

Other advantages are to be found in the simple rugged construction of the improved attachment whereby there are no parts that might be damaged or disabled by the usual rough handling and treatment that is afforded shop tools in every day use; in the fact that the attachment is adaptable to substantially any chuck carrying type of power tool; and in the few parts employed in the construction of the device whereby its manufacturing cost is relatively low.

Although but one specific embodiment of this invention has been herein shown and described it will be understood that numerous details of the construction shown may be altered or omitted without departing from the spirit of the invention as defined by the following claims.

I claim:

1. A reversible coupling comprising first and second body sections mounted together end to end for rotation, one relative to the other, about a common axis, the first section having an axial bore from end to end, a drive shaft rotatably journalled in said bore and extending therethrough, and a sun gear fast on the inner end of said shaft, a planetary gear system mounted on one of said body sections and meshed with said sun gear, a ring gear mounted on the other body section in driving relation with said planetary gear system, an axial passage extending through said second body section, a driven member having a shank extending rotatably into said passage, a head on said shank, and clutch means carried by each of said body sections axially spaced and individually engageable with said head to drive the same, said head having coacting means for driving engagement with said clutch means, and said shank being axially slidable in said passage for selective engagement of said head with said clutch means.

2. A reversible coupling comprising a pair of body sections mounted together end to end for rotation, one relative to the other, about a common axis, one of said sections having an axial bore therethrough and the other section having a central chamber opening toward the first section, said other section having a transverse wall adjacent its opposite end and an axial passage in said end wall opening into said chamber, a drive shaft journalled in the bore of said one section and extending into said chamber, gear means on the inner end of said shaft, a ring gear fast on said other section, a planetary transmission mounted on said one section and drivably interconnecting said shaft and said ring gear, a driven member having a shank extending into said other section through the end wall passage thereof, a head on the inner end of said shank and clutch means on each of said body sections axially spaced and individually engageable with said head, said head having coacting means for driving engagement with said clutch means, and said shank being rotatable and axially slidable in said passage for selective engagement of said head with said clutch means.

3. A reversible coupling comprising a pair of body sections mounted together end to end for rotation, one relative to the other, about a common axis, one of said sections having an axial bore therethrough and the other section having a central chamber opening toward the first section, said other section having a transverse wall adjacent its opposite end and an axial passage in said wall opening into said chamber, a drive shaft journalled in the bore of said one section and extending into said chamber, gear means on the inner end of said shaft, a ring gear fast on said other section, a set of planetary gears mounted on said one section and drivably interconnecting said shaft and said ring gear by means of said first named gear, an inner body mounted on said one section and disposed beyond the inner end of said shaft in axial alignment therewith, a driven member having a shank extending into said other section through the end wall passage thereof, a head on the inner end of said shank, and axially spaced clutch means on said inner body and said other section individually engageable with said head, said head having coacting means for driving engagement with said clutch means, and said shank being rotatable and axially slidable in said passage for selective engagement of said head with said clutch means.

4. A reversible coupling comprising a pair of body sections mounted together end to end for rotation, one relative to the other, about a common axis, one of said sections having an axial bore therethrough and the other section having a central chamber opening toward the first section, said other section having a transverse wall adjacent its opposite end and an axial passage in said wall opening into said chamber, a drive shaft journalled in the bore of said one section and extending into said chamber, gear means on the inner end of said shaft, a ring gear fast on said other section, a plurality of equiangularly spaced bearing members mounted on and projecting axially from said one section toward the other section, planet gears rotatably mounted on said bearing members and drivably interconnecting said shaft and said ring gear, an inner body mounted on said bearing members and disposed beyond the inner end of said shaft, a driven member having a shank extending into said other section through the end wall passage thereof, a head on the inner end of said shank, and axially spaced clutch means on said inner body and said other section individually engageable with said head, said head having coacting means for driving engagement with said clutch means, and said shank being rotatable and axially slidable in said passage for selective engagement of said head with said clutch means.

5. A reversible coupling comprising a pair of body sections mounted together end to end for rotation, one relative to the other, about a common axis, one of said sections having an axial bore therethrough and the other section having a central chamber opening toward the first section, said other section having a transverse wall adjacent its opposite end and an axial passage in said wall opening into said chamber, a drive shaft journalled in the bore of said one section and extending into said chamber, gear means on the inner end of said shaft, a ring gear fast on said other section, a set of planetary gears mounted on said one section and drivably interconnecting said shaft and said ring gear by means of said first named gear, an inner body integrally mounted on said one section and disposed beyond the inner end of said shaft in alignment therewith, said inner body having an internally threaded socket opening toward and axially aligned with the end wall passage of said other section, a driven member having a shank extending into said other section through said passage, a cylindrical head on the inner end of said shank having a single turn peripheral thread engageable with said threaded socket, and a counterbore in the inner side of said end wall concentric with said passage and internally threaded for engagement with the thread on said head, said shank being axially shiftable in said passage for selectively engaging said head with said socket and counterbore.

6. A reversible coupling comprising a pair of body sections mounted together end to end for rotation, one relative to the other, about a common axis, one of said sections having an axial bore therethrough and the other section having a central chamber opening toward the first section, said other section having a transverse wall adjacent its opposite end and an axial passage in said end wall opening into said chamber, a drive shaft journalled in the bore of said one section and extending into said chamber, gear means on the inner end of said shaft, a ring gear fast on said other section, a planetary transmission mounted on said one section and drivably interconnecting said shaft and said ring gear, an inner body integrally mounted on said one section and disposed beyond the inner end of said shaft in alignment therewith, said inner body having a socket opening toward and axially aligned with the end wall passage of said other section, said end wall having a counterbore on its inner side concentric with said socket, a driven member having a shank extending into said other section through said passage and a cylindrical head on the inner end of said shank having a single turn Acme thread projecting from its periphery, said socket and said counterbore each being internally threaded for receiving said head in threaded engagement, and said shank being axially shiftable in said passage for selectively engaging said head with said socket and said counterbore.

7. A reversible coupling comprising a pair of body sections mounted together end to end for rotation, one relative to the other, about a common axis, one of said sections having an axial bore therethrough and the other section having a central chamber opening toward the first section, said other section having a transverse wall adjacent its opposite end and an axial passage in said end wall opening into said chamber, a drive shaft journalled in the bore of said one section and extending into said chamber, gear means on the inner end of said shaft, a ring gear fast on said other section, a set of planetary gears mounted on said one section and drivably interconnecting said shaft and said ring gear by means of said first named gear, an inner body integrally mounted on said one section and disposed beyond the inner end of said shaft in alignment therewith, said inner body having a socket opening toward and axially aligned with the end wall passage of said other section, said end wall having a counterbore on its inner side concentric with said socket, a driven member having a shank extending into said other section through said passage, and a cylindrical head on the inner end of said shank having a single turn Acme thread projecting from its periphery, said socket and said counterbore each being internally threaded for receiving said head in threaded engagement, said shank being axially shiftable in said passage for selectively engaging said head with said socket and said counterbore, and the threaded portions of said socket and counterbore being axially spaced from each other a distance greater than the axial length of the thread on said head.

8. A reversible coupling comprising first and second cylindrical body sections peripherally connected in end to end relation for rotation relative to each other about a common axis, said sections each having an axial passage therethrough, a plurality of angularly spaced bearing members mounted on the first section radially equidistant from said common axis and projecting toward the second section, an inner body mounted on said bearing members in axially spaced relation with the first section, a drive shaft journalled in the passage of the first section and on the adjacent face of said inner body, a sun gear fast on said drive shaft between the first section and said inner body, planet gears rotatably mounted on said bearing members and meshed with said sun gear, a ring gear mounted concentrically on the second section and meshed with said planet gears, a rotatable and axially shiftable driven member mounted in the passage of said second section, said driven member having a head on its inner end, and coacting clutch means on said head and on each of said body sections, the clutch means on said body sections being axially spaced and selectively engageable with said head upon axial shifting of said driven member.

9. A reversible coupling comprising first and second cylindrical body sections peripherally connected in end to end relation for rotation relative to each other about a common axis, said sections each having an axial passage therethrough, a plurality of angularly spaced bearing members mounted on the first section radially equidistant from said common axis and projecting toward the second section, an inner body mounted on said bearing members in axially spaced relation with the first section, a drive shaft journalled in the passage of the first section and on the adjacent face of said inner body, a sun gear fast on said drive shaft between the first section and said inner body, planet gears rotatably mounted on said bearing members and meshed with said sun gear, a ring gear mounted concentrically on the second section and meshed with said planet gears, a rotatable and axially shiftable driven member mounted in the passage of said second section and having a cylindrical head on its inner end, and a single turn male thread formed on the periphery of said head, said inner body and said second section each having a socket portion axially aligned with said head and opening one toward the other for receiving said head individually upon selective axial shifting of said driven member, and each of said sockets having an internally threaded portion for driving engagement with the thread on said head.

10. A reversible coupling comprising first and second cylindrical body sections peripherally connected in end to end relation for rotation relative to each other about a common axis, said sections each having an axial passage therethrough, a plurality of angularly spaced bearing members mounted on the first section radially equidistant from said common axis and projecting toward the second section, an inner body mounted on said bearing members in axially spaced relation with the first section, a drive shaft journalled in the passage of the first section and on the adjacent face of said inner body, a sun gear fast on said drive shaft between the first section and said inner body, planet gears rotatably mounted on said bearing members and meshed with said sun gear, a ring gear mounted concentrically on the second section and meshed with said planet gears, a rotatable and axially shiftable driven member mounted in the passage of said second section and having a cylindrical head on its inner end, and a single turn male Acme thread formed on the periphery of said head, said inner body and said second section each having a socket portion axially aligned with said head and opening one toward the other for receiving said head individually upon selective axial shifting of said driven member, each of said sockets having an internally threaded portion for driving engagement with the thread on said head, and the threaded portions of said sockets being axially spaced apart a distance greater than the axial length of the thread on said head.

11. A device of the class described comprising first and second body sections mounted together for rotation about a common axis and one relative to the other, the first section having an axial bore therethrough and the second section having a cup-like central chamber opening toward the first section and bounded by a transverse end wall and an axially extending side wall, a plurality of angularly spaced dowels radially equidistant from said common axis and projecting axially from the first section into said chamber, an inner body member in said chamber and mounted on said dowels in axially spaced relation with said first section, a drive shaft journalled in said bore and extending therethrough into said chamber, a sun gear fixed on said shaft between said inner body member and said first section, planet gears rotatably mounted on said dowels and meshed with said sun gear, a ring gear encircling said planet gears in mesh therewith and mounted fast on the wall of said chamber, an axial passage through the end wall of said second section, a chuck member having a shank extending rotatably into said passage, a driving head on the inner end of said shank, and axially spaced clutch means on said inner body member and on said end wall for individual drivable engagement with coacting means on said head, said shank being axially slidable in said passage for selective engagement with said clutch means.

12. A device of the class described comprising first and second body sections mounted together end to end for rotation, one relative to the other, about a common axis, the first section having an axial bore therethrough and the second section being a hollow cup-like member opening toward the first section and having a transverse end wall, the end wall of said second section having a central passage therethrough, a drive shaft rotatably journalled in the bore of said first section and extending into said second section, a ring gear on the interior of said second section and secured fast thereto, a set of planetary gears mounted on said first section and drivably interconnecting said shaft and said ring gear, a rotatable driven member having a shank extending through said end wall passage and into said second section, a head on the inner end of said shank, and axially aligned and spaced clutch means on said body sections individually engageable with coacting means on said head for driving the same, said shank being axially slidable in said passage for selective engagement of said head with said clutch means.

13. A device of the class described comprising a pair of body sections mounted end-to-end for relative rotation about a common axis, said sections having axial bores through their opposite end walls and defining a central chamber between them, a drive shaft journalled in the bore of one section and extending into said chamber, gear means on the inner end of said shaft, a ring gear fast on the other section, a planetary transmission mounted on said one section as a part thereof and drivingly interconnecting said gear means and said ring gear, a driven member having a shank extending through the other bore and being rotatable and axially slidable in said other bore, and drive means between said driven member and each of said sections selectively including a protruding clutch element and a recess clutch element, one of said clutch elements being carried on each of said body sections with the two carried elements spaced axially from each other, and the other one of the clutch elements being carried upon the driven member and movable axially and rotatively therewith to engage selectively either one of the two elements carried on the body sections, said two carried elements having stop shoulders facing in opposite directions of rotation of said driven member.

References Cited in the file of this patent

UNITED STATES PATENTS

| | | |
|---|---|---|
| 1,201,364 | Shelton | Oct. 17, 1916 |
| 2,092,598 | Blair | Sept. 7, 1937 |
| 2,538,548 | Zimmerman | Jan. 16, 1951 |